(12) United States Patent
Marty et al.

(10) Patent No.: US 9,573,080 B2
(45) Date of Patent: Feb. 21, 2017

(54) CYCLONIC FLOW SEPARATOR

(75) Inventors: Jacques Marty, Pau (FR); Yves LeCoffre, Grenoble (FR); Guillaume Maj, La Tronche (FR)

(73) Assignee: TOTAL SA, Courbevoie (FR)

( * ) Notice: Subject to any disclaimer, the term of this patent is extended or adjusted under 35 U.S.C. 154(b) by 753 days.

(21) Appl. No.: 14/003,724

(22) PCT Filed: Feb. 10, 2012

(86) PCT No.: PCT/FR2012/050302
§ 371 (c)(1),
(2), (4) Date: Sep. 6, 2013

(87) PCT Pub. No.: WO2012/120211
PCT Pub. Date: Sep. 13, 2012

(65) Prior Publication Data
US 2013/0340622 A1    Dec. 26, 2013

(30) Foreign Application Priority Data
Mar. 7, 2011   (FR) ...................................... 11 51854

(51) Int. Cl.
*B01D 19/00*   (2006.01)
(52) U.S. Cl.
CPC ....... *B01D 19/0042* (2013.01); *B01D 19/0057* (2013.01)
(58) Field of Classification Search
None
See application file for complete search history.

(56) References Cited

U.S. PATENT DOCUMENTS

| 3,163,508 A | 12/1964 | Tuck et al. |
| 3,304,697 A | 2/1967 | Ramsey |
| 3,488,927 A | 1/1970 | Jepsen et al. |
| 3,807,142 A | 4/1974 | Rich et al. |
| 4,443,331 A | 4/1984 | Julien Saint Amand |
| 6,231,645 B1 | 5/2001 | Conrad et al. |
| 6,251,296 B1 | 6/2001 | Conrad et al. |
| 2003/0121416 A1* | 7/2003 | Morse ................ B01D 19/0005 95/261 |

(Continued)

FOREIGN PATENT DOCUMENTS

| EP | 1 600 215 A1 | 11/2005 |
| GB | 2 439 528 A | 1/2008 |

(Continued)

*Primary Examiner* — Duane Smith
*Assistant Examiner* — Phillip Shao
(74) *Attorney, Agent, or Firm* — Patterson Thuente Pedersen, P.A.

(57) ABSTRACT

A separator of a mixture of liquid and gas, comprising an injection device, a separation chamber having a cylindrical internal surface and extending along a vertical axis, and a control chamber. The mixture is separated in the separation chamber into gas and liquid, with a cylindrical interface surface. The separation chamber comprises a first axial outlet for extracting the gas, a second outlet for extracting the liquid, and a third axial outlet in communication with the control chamber. The interface surface has, in normal operating conditions, a diameter lying between the diameter of the first outlet and the diameter of the third outlet. The control chamber is connected to the injection device by a return circuit.

13 Claims, 4 Drawing Sheets

(56) References Cited

U.S. PATENT DOCUMENTS

| | | | | |
|---|---|---|---|---|
| 2007/0084340 A1* | 4/2007 | Dou | ............... | B01D 19/0057 |
| | | | | 95/8 |
| 2009/0020467 A1* | 1/2009 | Parkinson | .......... | B01D 17/0217 |
| | | | | 210/188 |
| 2012/0132079 A1* | 5/2012 | Naess | ............... | B01D 19/0057 |
| | | | | 96/174 |
| 2012/0297986 A1* | 11/2012 | Suda | ............... | B01D 19/0057 |
| | | | | 96/212 |

FOREIGN PATENT DOCUMENTS

| | | |
|---|---|---|
| WO | WO 01/00296 A1 | 1/2001 |
| WO | WO 01/36561 A1 | 5/2001 |

\* cited by examiner

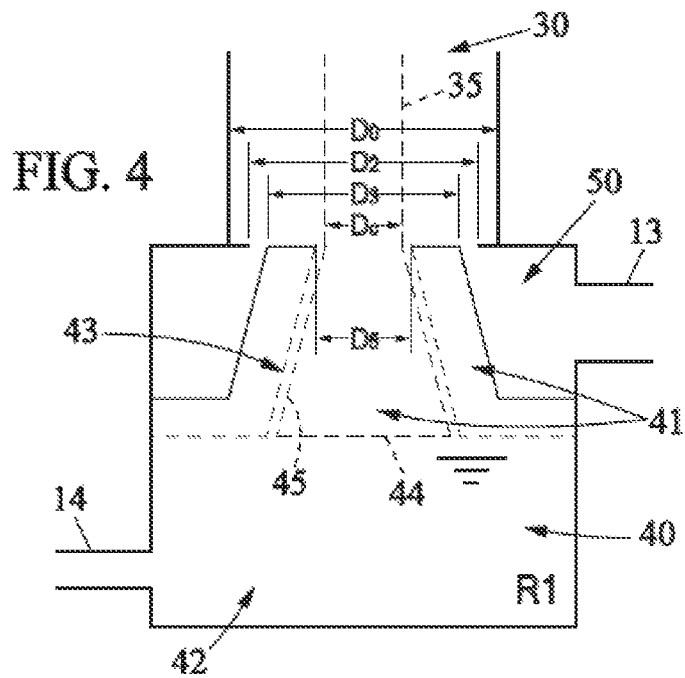
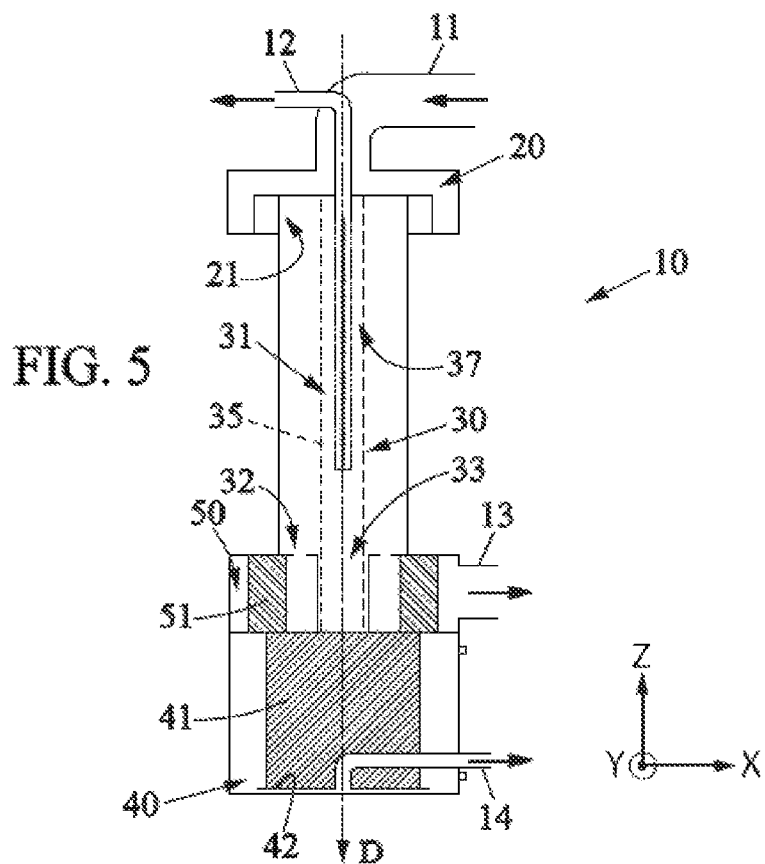

CYCLONIC FLOW SEPARATOR

PRIORITY CLAIM

The present application is a National Phase entry of PCT Application No. PCT/FR2012/050302, filed Feb. 10, 2012, which claims priority from FR Application No. 1151854 filed Mar. 7, 2011, said applications being hereby incorporated by reference herein in their entirety.

FIELD OF THE INVENTION

The present invention relates to a cyclonic-flow separator for separating components of a fluid medium, and notably for separating phases of a mixture of liquid and gas.

BACKGROUND OF THE INVENTION

Document WO-01/00296 describes an example of a separation device comprising a first separator comprising in series in a longitudinal direction of flow, an inlet for a mixture of a liquid and gas, an accelerator for rotating the said mixture, a separation chamber and a liquid outlet. By a cyclonic effect, a gaseous phase of the mixture is concentrated in the centre of the separation chamber in the form of a gas cylinder, surrounded by a liquid phase. This separator comprises a gas outlet at the centre of the separation chamber for extracting the gas.

However, some liquid is drawn towards the central zone and the extracted gas still comprises a fraction of liquid.

In order to improve the separation, the separation device of the document WO-01/00296 then comprises a second separator of the gravity type, fed by the gas outlet of the first separator.

Such a separation device is then bulky and costly.

SUMMARY OF THE INVENTION

The object of the present invention is to avoid the use of two separators and to reduce the bulk of the device.

More particularly, the invention relates to a separator of a mixture of liquid and gas comprising an injection device, a separation chamber having a substantially cylindrical internal surface and extending along a vertical longitudinal axis, and a control chamber, in which:
  the injection device is fed by the mixture of liquid and gas, and injects the mixture into the separation chamber, in a manner that is substantially tangential to the internal surface, such that the mixture is separated in the separation chamber into gas situated in a central volume and liquid situated in an annular volume around the central volume, an interface surface separating t4229he said central and annular volumes,
  the separation chamber comprises a first axial outlet for extracting the gas from the central volume, a second outlet at a distance from the said axis for extracting the liquid from the annular volume, and a third axial outlet in communication with the control chamber, the said third outlet having a diameter greater than the diameter of the first outlet and smaller than an internal diameter of the second outlet,
  the control chamber receives a quantity of liquid which flows from the separation chamber to form a volume of liquid having an upper surface, and is connected to the injection device by a return circuit to reinject a quantity of liquid from the said control chamber to the injection device, and
  a regulation means suitable for regulating a level of the upper surface by reinjecting the quantity of liquid through the return circuit, and such that the said interface surface has, in normal operating conditions, a diameter lying between the diameter of the first outlet and the diameter of the third outlet so that the said interface surface enters the control chamber and the liquid from the separation chamber flows to the said control chamber.

By virtue of these arrangements, the separation of the liquid from the gas is extremely effective: the gas extracted by the first axial outlet contains only very little liquid, and the liquid extracted through the annular outlet contains only very little gas.

Moreover, the interface surface between the liquid and the gas in the separation chamber has a very stable substantially cylindrical shape. The diameter of this interface surface varies little, even when the feeding conditions of the separator vary.

In various embodiments of the separator of a mixture of liquid and gas according to the invention, it is possible optionally to also make use of one and/or the other of the following arrangements:
  the first outlet is formed of a tube extending along the axis in the central volume, the said tube comprising lateral openings for extracting the gas from the said central volume;
  the second outlet is an annular opening having an external diameter smaller than the diameter of the internal surface of the separation chamber;
  the volume of the control chamber is smaller than the volume of the separation chamber, and preferably between 10% and 50% of the volume of the separation chamber;
  the control chamber comprises at least one annular portion of its volume situated around the separation chamber;
  the control chamber comprises a first portion into which the interface surface penetrates, a second annular portion situated beneath the first portion and around the separation chamber, and tubes connecting the said first and second portions in order to convey by gravity the liquid from the first portion to the second portion of the control chamber, the said liquid being extracted from this second portion of the control chamber to be reinjected to the injection device;
  the separator also comprises a tank connected to the control chamber by an outgoing pipe for extracting liquid from the control chamber to the tank, and a return pipe for extracting liquid from the tank to the control chamber;
  the control chamber comprises at least one control chamber sensor for measuring a liquid level in the said control chamber and also comprises a first control unit controlling a pump and a valve situated in the outgoing and return pipes, the first control unit being suitable for controlling the liquid level in the control chamber;
  the tank comprises at least one tank sensor for measuring a liquid level in the said tank, and also comprises a second control unit controlling a pump for feeding the tank with liquid and a valve for discharging liquid from the reservoir, the said second control unit being suitable for controlling the said liquid level in the tank;
  the control chamber comprises guiding elements for guiding the liquid that are designed to reduce a rotation about the longitudinal axis of the liquid originating from the separation chamber;

the separation chamber extends downwards between an upstream wall close to the injection device and a downstream wall opposite to the upstream wall, and the first outlet is situated in the upstream wall, and the second and third outlets are situated in the downstream wall;

the separation chamber extends upwards between an upstream wall close to the injection device and a downstream wall opposite to the upstream wall, and the first, second and third outlets are situated in the downstream wall.

BRIEF DESCRIPTION OF THE DRAWINGS

Other features and advantages of the invention will appear throughout the following description of five of its embodiments given as non-limiting examples with respect to the appended drawings.

In the drawings:

FIG. 4 is an enlarged view of the second end of the separation chamber and of the control chamber of the separator of FIG. 1, FIG. 5 is a schematic view in longitudinal section of a second embodiment of a separator of the type of the invention.

DETAILED DESCRIPTION OF THE DRAWINGS

In the figures, the separator 10 extends in a direction with an axis D, corresponding to the general direction of flow in the latter between upstream and downstream.

A lateral or transverse direction mentioned in this description must be understood to be the direction X or Y designated in the figures. These lateral or transverse directions are mentioned only to aid the reading and the understanding of the invention. The direction Z corresponds to a vertical direction upwards, that is to say opposite to a force of gravity being exerted downwards. As is usual, an element will be designated "above" another when the latter is positioned in the direction Z relative to the other, and it will be designated "below" another in the converse case. The direction D is vertical. It is either equal to the direction Z or opposite to the latter.

In the various figures, the same references designate identical or similar elements.

Figure 1:
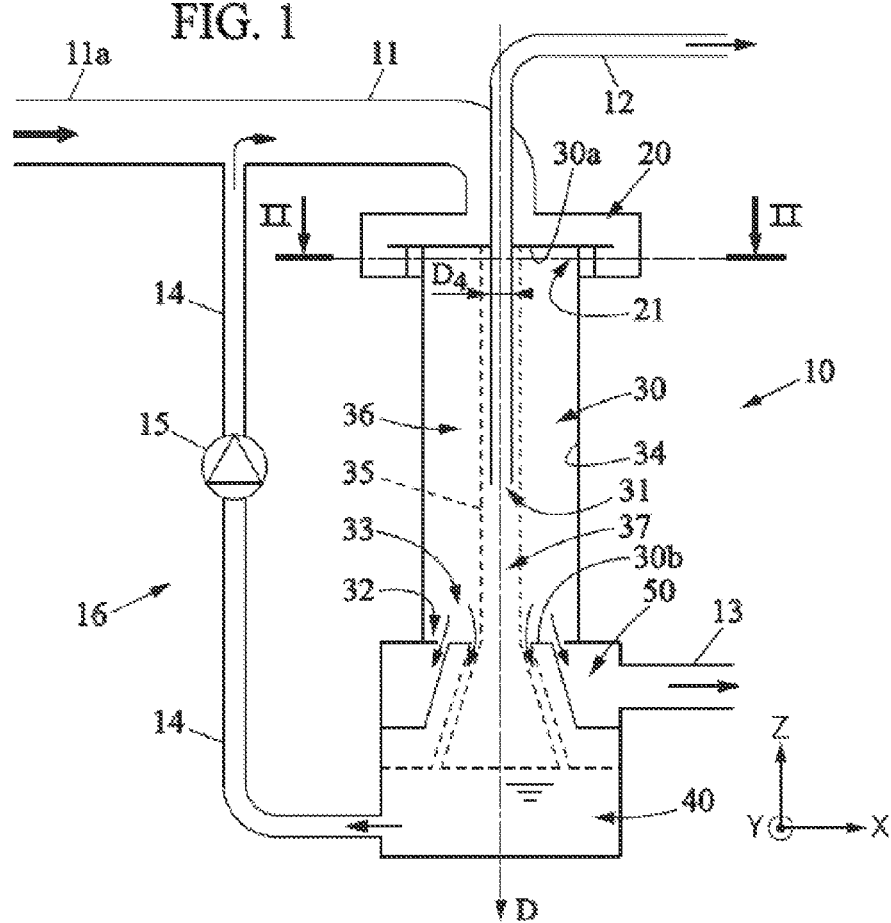
FIG. 1 is a schematic view in longitudinal section of a first embodiment of a separator of the type of the invention.

FIG. 1 is a schematic view, in longitudinal section, of a first embodiment of a separator 10 of a mixture of liquid and gas according to the invention.

The mixture in question comprises for example very fine bubbles of gas dispersed in a liquid. These bubbles have for example a diameter of less than 200 µm, and often less than 100 µm.

The liquid may be water, oil or any hydrocarbon in liquid form.

The gas may be a hydrocarbon in gaseous phase, natural gas or any other gas.

The mixture entering the separator may comprise a fraction by volume of gas that is very variable, and for example lying between 5% and 25%. The separated gas leaving the separator must comprise no liquid, or very little thereof. Notably, the separated gas contains less than 0.5% of liquid by volume, and preferably less than 0.05%, and yet more preferably less than 0.01%. The separator 10 according to the invention, according to optimized dimensions, allows such separation performance. The separated liquid leaving the separator must not contain gas, or in a fraction by volume that is less than 2%. This therefore corresponds to a very good quality of separation. Moreover, the flow rates of mixture may be very great, of the order of 200 liters/second (700 m$^3$/h). It is therefore very difficult to construct such a liquid-gas separator.

The separator 10 is generally cylindrical in shape and has for example an external diameter of less than 500 mm.

The separator 10 comprises:
a feed pipe 11 for feeding it with a mixture of liquid and gas,
a first outlet pipe 12 for extracting the gas separated from the mixture, and
a second outlet pipe 13 for extracting the liquid separated from the mixture.

This separator 10 also comprises, in a longitudinal direction with an axis D corresponding to the direction of flow of the mixture in the separator:
an injection device or accelerator 20,
a separation chamber 30 in the extension of the accelerator 20, and
a control chamber 40 in the extension of the separation chamber 30.

The injection device 20 is connected upstream to the feed pipe 11 in order to be fed with the mixture.

Figure 2:
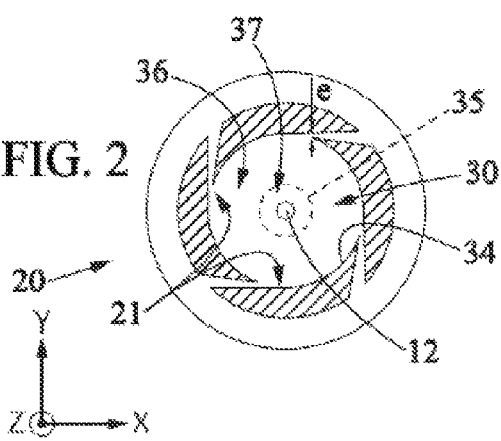
FIG. 2 is a view in section along the line II-II of the injection device of the separator of FIG. 1.

According to a first variant shown in FIGS. 1 and 2, the injection device 20 is usually called the "accelerator". This injection device 20 comprises a plurality of channels, and preferably four channels, emerging downstream through openings 21 in the separation chamber 30 and in a manner substantially tangential to a cylindrical internal surface 34 with an axis D of this separation chamber.

Figure 3:
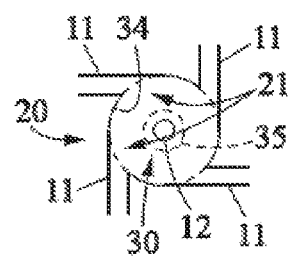
FIG. 3 is a view in section of a variant of the injection device of the separator of FIG. 1.

According to a second variant shown in FIG. 3, the injection device 20 comprises one or more separated ducts, emerging through openings 21 in the separation chamber 30, also substantially tangentially to the cylindrical internal surface 34 of the separation chamber 30.

The channels, ducts and openings of the injection device 20 cited above are of circular or rectangular cross section and preferably all identical.

The mixture is advantageously injected by the injection device 20 into the separation chamber 30 at a high speed in order to form a cyclonic flow in the separation chamber 30, but below a predetermined limit in order to avoid obtaining too turbulent a flow which would cause fractionation of the gas bubbles, which would harm the separation. The speed of injection into the separation chamber 30 is therefore for example between 5 and 20 m/s, and preferably between 10 and 15 m/s.

The separation chamber 30 has a substantially cylindrical internal surface 34 with its diameter marked $D_0$ extending along the longitudinal axis D between an upstream wall 30a and a downstream wall 30b. It comprises upstream openings 21 conveying the mixture tangentially from the said accelerator 20 to the said internal surface 34 of the separation chamber.

By virtue of the flow of the mixture in the separator and by virtue of the tangential feeding of the separation chamber 30 by the channels, the accelerator 20 forces the mixture of liquid and gas to rotate about the axis D as soon as it enters the separation chamber 30.

The rotating mixture then has in the separation chamber 30 a cyclonic flow regimen which is particularly effective for the separation of the components or phases of a mixture, having densities that differ from one another. The densest phases are concentrated in a radial position further from the centre (from the axis D) than the least dense phases. In an ideal cyclonic flow, the tangential speed of the components of the mixture increases according to a hyperbolic law from the periphery of the separation chamber to a radius where it achieves a maximum value, then decreases between this radius and the centre of the separation chamber according to a linear law. It is in particular zero at the centre of the separation chamber. This subjects the mixture to radial accelerations that are inversely proportional to the cube of the radius of the hyperbolic zone.

By virtue of this flow in a cyclonic regimen in the separation chamber 30, the mixture of liquid and gas is progressively separated as it approaches the downstream wall 30b again, in an essentially liquid phase at a distance from the axis D and extending in an annular volume 36 about the axis D, and a gaseous phase close to the axis D and extending in a central volume 37 that is substantially cylindrical surrounded by the annular volume 36. A substantially cylindrical interface surface 35 in the longitudinal direction of the axis D separates the gaseous phase at the centre of the mixture on the periphery, the mixture being purified from upstream to downstream, becoming depleted in gas. This cylindrical interface surface 35 has a diameter marked $D_c$ in FIG. 4. The interface surfaces separating the liquid phase from the gas phase are shown in the figures in dashed lines.

The separation chamber 30 comprises:
- a first axial outlet 31 for extracting the gas concentrated in the central volume 37 around the axis D,
- a second outlet 32 at a distance from the axis D for extracting the liquid concentrated in the annular volume 36, and
- a third axial outlet 33.

The first axial outlet 31 is formed by a tube extending along the axis X and having a diameter marked $D_4$. This first outlet 31 is connected to the first outlet pipe 12 for extracting the gas from the separator 10.

In FIG. 1, this first outlet 31 is positioned upstream of the separation chamber 30, that is to say close to the accelerator 20.

The second outlet 32 is placed at a downstream end of the separation chamber 30.

This second outlet 32 is for example connected to an extraction chamber 50 as shown in the figures for extracting the liquid from the separator 10 through the second outlet pipe 13.

The second outlet 32 is an annular opening or slot formed at the downstream end of the separation chamber 30. It extends between an internal diameter marked $D_3$ and an external diameter marked $D_2$ as shown in FIG. 4.

The external diameter $D_2$ of this second outlet 32 is smaller than the diameter $D_0$ of the internal surface 34 of the separation chamber 30. The mixture contained in the separation chamber is thus forced to move towards the centre of the separator, to a radial position of the axis D where the tangential speed is higher. For one and the same injection speed of mixture into the separation chamber 30, the gas is better separated from the liquid and bubbles of smaller dimensions can be separated from the liquid.

The third axial outlet 33 is formed by a circular hole in the wall of the downstream end of the separation chamber 30. This third outlet 33 is in communication with the control chamber 40 situated in the extension beneath the separation chamber 30 in the direction of the axis D. This third outlet 33 has a diameter marked $D_5$ which is smaller than the internal diameter $D_3$ of the second outlet 32.

The central volume 37 of gas extends into the control chamber through the volume marked 41. In normal operation, the diameter $D_5$ of the third outlet 33 is greater than the diameter $D_c$ of the interface surface 35. Thus, the interface surface 35 penetrates or extends into the control chamber 40 through a surface 45 which for example tends to widen out in the direction of the axis D towards the inside of the control chamber, due to the centrifugal component of the speed of a fluid element.

By virtue of this feature, a first quantity of liquid from the separation chamber close to the interface surface 35 flows continuously towards the control chamber 40 in the form of a layer of liquid of annular section, widening out in the direction of the axis D, denoted by the reference 43, and extending up to an upper surface 44 corresponding to an average level of filling of a control volume 42 of this control chamber 40 by the liquid poured from the separation chamber 30.

The mixture or liquid flowing from the separation chamber 30 to the control chamber 40 is already to a very great extent separated, so that it is possible to consider that this mixture is essentially liquid.

Moreover, it should be noted that this control chamber 40 and this flow or pouring mainly has the effect of stabilizing the interface surface 35 and not of carrying out a second gravity separation. Notably, the volume of this control chamber 40 and the flow rates would not allow such an effective gravity separation.

The continuous pouring of mixture or liquid from the separation chamber 30 to the control chamber 40 is therefore assured, this pouring making it possible to keep the diameter $D_c$ of the interface surface 35 constant and stable, and making it possible to ensure that the diameter $D_c$ of the interface surface 35 is smaller than the diameter $D_5$ of the third outlet 33.

This diameter $D_c$ is consequently smaller than the internal diameter $D_3$ of the second outlet 32.

Consequently, the gas previously separated by cyclonic effect and collected in the central volume 37 does not risk being drawn towards the second liquid outlet 32.

Reciprocally, the diameter $D_5$ of the third outlet 33 is greater than the diameter $D_4$ of the first outlet 31, and it is greater than the diameter $D_c$ of the interface surface. The diameter $D_c$ of the interface surface 35 is between the diameter $D_4$ of the first outlet 31 and the diameter $D_5$ of the third outlet.

The liquid from the annular volume 36 does not risk being drawn into the first gas outlet 31.

The control chamber 40 is then connected to the feed channel 11 by a return circuit 16 comprising at least one return pipe 14, and optionally a pump 15 and/or a valve. The feed pipe 11 then comprises a first portion 11a upstream of this connection. The separator is fed by this first portion 11a with a mixture feed flow rate. At the connection of the return pipe 14, a liquid return flow rate originating from the control chamber 40 is added to the feed flow rate in the said feed pipe 11.

The liquid or mixture of liquid and gas from the control chamber 40 is thus reinjected into the accelerator 20 in order to be separated again.

This control chamber 40 is not a second separator of the gravity type, since its contents are reinjected to the feed pipe 11 upstream.

The volume of the control chamber 40 may be small, in particular it may be smaller than the volume of the separation chamber 30. Preferably, it is between 10% and 50% of the volume of the separation chamber 30. The volume of the control chamber 40 must be able to contain sufficient liquid mixture for the pump 15 of the return circuit 16, in normal operation, to inject a continuous flow rate of mixture towards the first pipe 11. The separator 10 must then be started up, partially filling the control chamber 40.

By virtue of this arrangement, the volume of this control chamber 40 is greatly reduced and may be incorporated into one and the same body as the separation chamber 30 of the separator 10.

Normal operation is an operation of the separator 10 in which the diameter $D_c$ of the interface surface is between the diameter $D_4$ of the first outlet 31 and the diameter $D_5$ of the third outlet 33, that is to say:

$$D_4 < D_c < D_5.$$

Moreover, for such a separator 10 comprising a control chamber 40 into which liquid from the separation chamber 30 is poured, the radial position of the interface surface 35 is extremely stable. The volume of gas and liquid from the control chamber 40 acts like a damper to damp the variations in the diameter $D_c$ of the interface surface 35, notably when the feed conditions vary in terms of flow rate or of pressure.

If the diameter $D_c$ of the interface surface 35 decreases when the flow rate of mixture injected into the separation chamber 30 increases, a flow rate of mixture or liquid poured into the control chamber 40 increases due to the increase in the section of pouring between the diameter $D_5$ of the third outlet 33 and the diameter $D_c$ of the interface surface 35. In closed-circuit operation, in which the pump 15 reinjects a constant flow rate upstream, the increase in the poured flow rate increases the volume of liquid contained in the control chamber 40 and reduces the volume of liquid contained in the separation chamber 30. The flow rate of pouring of the mixture to the control chamber 40 then has the effect of increasing the diameter $D_c$ of the interface surface 35, hence an effect opposing its cause.

If, on the other hand, the diameter $D_c$ of the interface surface 35 increases because the flow rate of mixture injected into the separation chamber 30 reduces, the flow rate of liquid or mixture poured into the control chamber 40 is reduced, which results in a reduction in the volume of liquid contained in the control chamber 40 and an increase in the volume of liquid contained in the separation chamber 30. Therefore, the diameter $D_c$ of the interface surface 35 reduces.

The diameter $D_c$ of the interface surface 35 is thus extremely stable. The separator 10 does not need a rapid regulation to control the diameter $D_c$ of the interface surface 35. It is then sufficient to apply a regulation of the level of liquid contained in the control chamber. By virtue of the volume of the control chamber, the separator according to the invention can have a longer response time than the time that is characteristic of variations in feed flow rate or feed pressure.

The diameter $D_c$ of the interface surface 35 has a stable value higher than the diameter $D_4$ of the first outlet 31. The first outlet 31 draws no liquid and the extracted gas is thoroughly separated from the liquid.

In normal operation, the diameter $D_c$ of the interface surface 35 has a stable value lower than the diameter $D_5$ of the third outlet 33 and therefore lower than the internal diameter $D_3$ of the second outlet 32. The second outlet 32 does not draw previously separated gas and the extracted liquid is extremely well separated from the gas. It contains only small residual bubbles that have not been able to be separated by the cyclonic flow.

By virtue of these arrangements, the gas and the liquid are extremely well separated in a single separation device, which furthermore is simple to control, without requiring the use of a rapid closed-loop control.

Moreover, for such a separator 10 comprising a control chamber 40 in which the liquid from the separation chamber 30 pours continuously, the flow into the separation chamber has a cyclonic characteristic between the internal surface 34 of this separation chamber (diameter $D_o$) and the second outlet (internal diameter $D_3$), but it also tends to retain this cyclonic characteristic up to the third outlet (diameter $D_5$), and even up to the diameter $D_c$ of the interface surface 35.

By virtue of this effect, the tangential speeds in the mixture at a radial position close to the diameter $D_5$ of the third outlet are considerable. The effects of this are, on the one hand, to stabilize the interface surface 35, and, on the other hand, to increase the quantity of gas bubbles separated in the separation chamber 30. The separator according to the invention is therefore extremely efficient.

FIG. 5 shows a second embodiment of the separator 10. In this embodiment, the tube of the first outlet 31 extends over a predetermined length between the upstream and the downstream of the separation chamber 30. It is pierced with holes or slots along this length so as to better extract the gas from the central volume 37. The said predetermined length may lie between 0.25% and 0.75% of the distance between the upstream wall 30a and the downstream wall 30b of the separation chamber 30. Such a perforated tube of first outlet 31 may be suitable for all the embodiments.

By virtue of this arrangement, the speed of the gas extracted by the first outlet 31 is reduced. Risks of drawing by aerodynamic forces of the liquid situated at the interface surface 35 are thus reduced.

The extraction chamber 50 comprises guiding elements 51 for guiding the liquid that are suitable for reducing and substantially stopping the rotation of the liquid originating from the separation chamber 30 before being extracted to the second outlet pipe 13. These guiding elements shown by cross hatching in FIG. 5 are for example radial fins relative to the axis D, extending in the direction of the axis D, and integrated into the volume of the extraction chamber 50.

The control chamber 40 also comprises guiding elements 41 for guiding the liquid that are suitable for reducing and substantially stopping the rotation of the liquid originating from the separation chamber 30 before being extracted to the third outlet pipe 14. These guiding elements 41 may be similar to those specified for the extraction chamber 50.

Moreover, this control chamber 40 may comprise an internal wall 42 under which the liquid is extracted through the third outlet pipe 14.

By virtue of the latter two arrangements, the risks of drawing gas by vortex effect are reduced, or even substantially removed, and the duct 14 extracts mainly liquid and not a mixture of liquid and gas.

Figure 6:
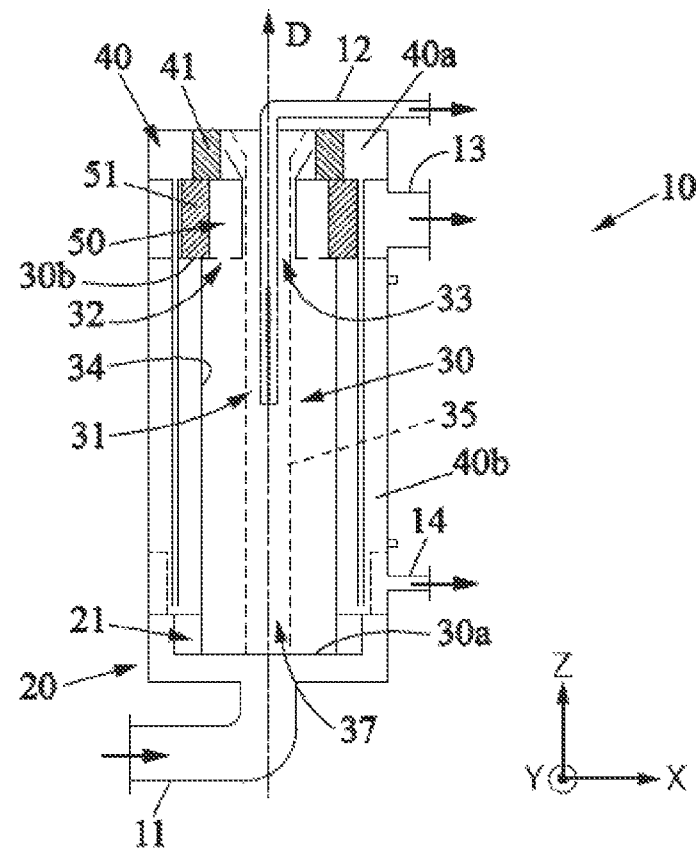
FIG. 6 is a schematic view in longitudinal section of a third embodiment of a separator of the type of the invention.

FIG. 6 shows a third embodiment of the separator 10. In this embodiment, the flow takes place from bottom to top unlike the previous two embodiments, and the control chamber 40 is placed around the separation chamber 30.

All the outlets 31, 32, 33 of the separation chamber 30 are situated at the top, and downstream of the flow (in the direction D).

The first outlet 31 is in this instance downstream and comprises a tube pierced with holes along a predetermined length between the downstream and the upstream of the separation chamber 30.

The control chamber 40 comprises:
- a first portion 40a situated at the top in which the central volume 37 of gas penetrates and liquid pours,
- a second annular portion 40b situated around the separation chamber 30, and
- tubes 42 that are substantially vertical and are traversing the extraction chamber 50 in order to carry by gravity the liquid or mixture from the first portion 40a to the second portion 40b of the control chamber 40.

The third outlet pipe 14 extracts at the bottom of the second portion 40b the liquid from this chamber.

In the figure, cross-hatched zones show guiding elements for reducing or substantially stopping the rotation of the liquid in the control chamber 40 and the extraction chamber 50.

Figure 7:
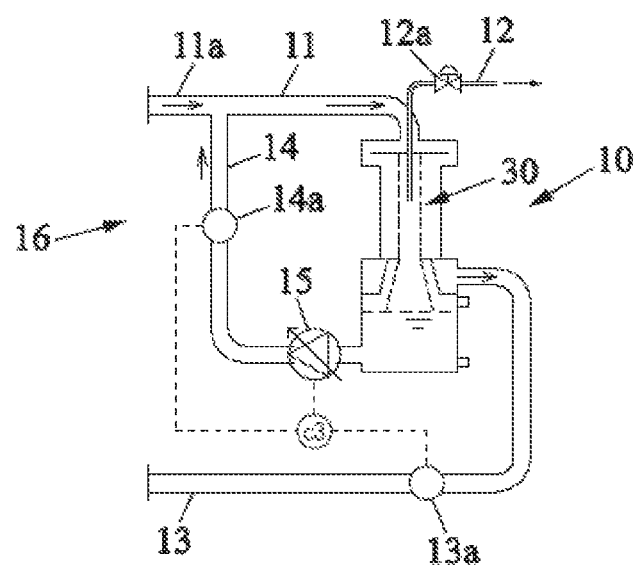
FIG. 7 is a schematic view in longitudinal section of a fourth embodiment of a separator of the type of the invention.

FIG. 7 shows a fourth embodiment of the separator 10. In this embodiment, the separator 10 also comprises:
- a first flow-rate sensor 13a for measuring a first flow rate of liquid in the second outlet pipe 13,
- a second flow-rate sensor 14a for measuring a second flow rate of liquid in the return pipe 14, and
- a control unit c3 which controls the pump 15 situated in the return pipe 14.

Notably, the control unit c3 can control the rotation speed of the pump 15 via a control law that is a function of the first and second measured flow rates.

For example, the control law may be determined so that the total of the first and second flow rates is greater than a predetermined minimum threshold.

By virtue of these arrangements, the injection speed of the mixture into the separation chamber 30 by the injection device or accelerator 20 can be maintained at a sufficiently high value, even when the feed flow rate of the first portion 11a of the feed pipe 11 reduces, so that the cyclonic regimen in the separation chamber 30 is maintained and the separation of the mixture remains efficient.

Figure 8:
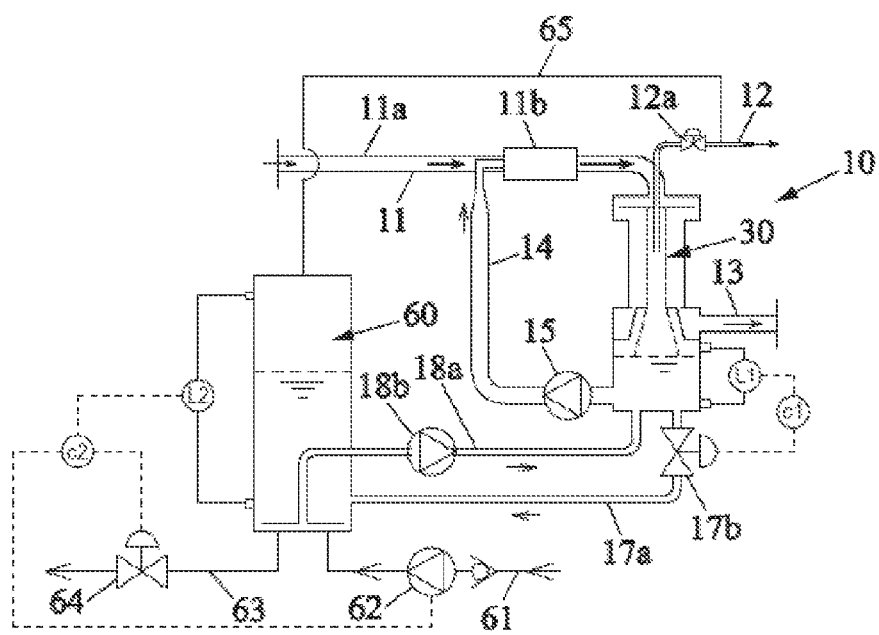
FIG. 8 is a schematic view in longitudinal section of a fifth embodiment of a separator of the type of the invention.

FIG. 8 shows a fifth embodiment of the separator 10. In this embodiment, the separator 10 also comprises a tank 60 connected to the control chamber 40 by:
- an outgoing pipe 17a optionally comprising a control valve 17b for extracting the mixture from the control chamber 40 to the tank 60, and
- a return pipe 18a comprising a pump 18b for extracting the mixture from the tank 60 to the control chamber 40.

By virtue of these arrangements, the control volume 42 of the control chamber 40 is increased, which makes it possible to treat the separation of a mixture having a fraction by volume of gas which may vary over time in much greater proportions. The separator is then yet more tolerant of the variations and temporal transients of the fraction by volume of gas in the mixture.

Moreover, the level of the top surface 44 in the control chamber 40 can be kept constant, by adjusting the flow rate in the outgoing pipe 17a by the control valve 17b, and/or by adjusting the flow rate in the return pipe 18a by the pump 18b.

The pressure in the tank 60 can be imposed by connecting it via a pipe 65 to the first gas outlet pipe 12 of the separator. The pump 18b and the valve 17b are then subjected to a constant pressure difference.

Variations in the flow rate of the mixture in the feed pipe 11 influence only the liquid level in the tank 60 and not the liquid level in the control chamber 40. The return circuit 16 is always fed with a constant level of liquid in the control chamber 40.

The separator 10 may then also comprise:
- a control-chamber sensor L1 for measuring a liquid level in the said control chamber 40, and
- a first control unit c1 which opens or closes the valve 17b and which optionally controls the pump 18b depending on the liquid level measured in the control chamber 40 by the control-chamber sensor L1.

The pump 18b operates for example at constant speed.

The separator 10 may also comprise:
- a tank sensor L2 for measuring a level of mixture or of liquid in the said tank 60, and
- a second control unit c2 which opens or closes a valve 64 for discharging mixture or liquid, which valve is connected to the tank 60 by a pipe 63 for reducing the liquid level in the tank 60, and which optionally actuates a pump 62 connected to the tank 60 by another pipe 61 for feeding the said tank 60 and increasing the liquid level in the tank 60.

The control units c1, c2 are optional and may be used independently of one another or in combination. They may have fairly long response times such that the complete looped system of the separator 10 is equally extremely stable with a considerable margin of stability.

For example, the discharge valve 64 will be used to reduce the volume of liquid in the loop of the separator 10, when liquid is accidentally inserted into this loop.

Reciprocally, the feeding of liquid into the tank 60 by the pump 62 will be used to increase the volume of liquid in the loop of the separator 10 in order to compensate for slow drifting such as the vaporization of liquid and the drawing of the vapour with the gas into the first outlet pipe 12, or else the losses accumulated over the long term due to a drawing, which is even very slight, of liquid into the first outlet 31.

The operation of the separator 10 is thus easily controllable and stable irrespective of the continuous or discontinuous variations of the fraction by volume of gas in the incoming mixture. The tank 60 is a subsidiary component added to increase the stability over temporally transient variations.

Moreover, for all the embodiments of the invention, a mixing device 11b can be incorporated into the feed pipe 11 at the liquid reinjection of the return pipe 14. By virtue of the return circuit 16 and of this mixing device 11b, the operation of the separator 10 is less sensitive to variations of fraction by volume of gas, notably in the event of transient variations conveying a large quantity of gas. Without this device, the tangential injection speed of the mixture by the accelerator 20 could decrease to such a point that the cyclonic regimen in the separation chamber 30 could be disrupted and the central volume 37 could have instabilities. Such a mixing device 11b is then useful for removing such drawbacks in the event of use in an installation delivering variations of fraction by volume of gas in the mixture that are too great.

Moreover, the various productions and simulations of the separator according to the invention have shown that the latter had a normal operation or established regimen corresponding to a mixture containing up to 40% of gas by volume. The dimensions obtained for having such a normal operation observe by 30% more or less the following conditions on the diameters:

$$D_5 = D_0/3,$$

$$D_3 = 1/2 \cdot D_0, \text{ and}$$

$$D_2 = (D_0 + D_3)/2.$$

The separator 10 is suitable for achieving great separation performance and it is stable.

It also remains stable over a certain period in extreme normal conditions when the fraction by volume of gas contained in the mixture entering the feed pipe 11 (first portion 11a) becomes zero. Such an extreme condition may occur exceptionally or repetitively. The interface surface 35 remains substantially stable with a substantially constant diameter. It no longer delivers gas into the first outlet pipe 12, and above all it delivers no liquid into this outlet if the said period remains below a limit value determined for example experimentally.

This separator makes it possible to separate a gaseous phase that is finely dispersed in a liquid phase for a wide range of fraction by volume of gas in the mixture, for example between 0% and 40%.

It also has the advantage of generating only a slight pressure loss between the incoming mixture (in the feed pipe 11) and the extracted gas at the outlet (in the first outlet pipe 12), or the liquid at the outlet (in the second pipe 13).

In the various embodiments, it is possible to define:
- a first pressure P11 is the pressure of the mixture in the feed pipe 11,
- a second pressure P12 is the gas pressure in the first outlet pipe 12, and
- a third pressure P13 is the pressure of separated liquid in the second outlet pipe 13.

It is then possible to calculate a coefficient K by the ratio of the difference between the first pressure P11 and the second pressure P12, and of the difference between the first pressure and the third pressure, that is to say:

$$K = \frac{P11 - P12}{P11 - P13}.$$

The simulations and productions of the separator according to the invention have therefore shown that this separator could be used according to a normal operation having a powerful separation of the mixture, for values of the coefficient K of between 1 and 3, and preferably of between 1.5 and 2, with a ratio $D_3/D_5$ of the internal diameter $D_3$ of the second outlet over the third outlet diameter $D_5$ of between 1.1 and 2, and preferably of between 1.2 and 1.5. This separator may then advantageously be used in a gas compression installation comprising a discharge device such as that described in the published patent application FR-2 944 218. In these installations, a gravity separator is usually used. Gravity separators are not very effective (separation quality and flow rates) and are bulky. It may also be used in many industrial installations.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A separator of a mixture of a liquid and a gas, comprising an injection device, a separation chamber having a substantially cylindrical internal surface and extending along a vertical longitudinal axis, and a control chamber, in which:
    the injection device is fed by the mixture of liquid and gas, and injects the mixture into the separation chamber substantially tangential to the internal surface, such that the mixture is separated in the separation chamber into gas situated in a central volume and liquid situated in an annular volume around the central volume, an interface surface separating the said central and annular volumes,
    the separation chamber comprises a first axial outlet for extracting the gas from the central volume, a second outlet at a distance from the said axis for extracting the liquid from the annular volume, and a third axial outlet in communication with the control chamber, the third axial outlet having a diameter greater than the diameter of the first axial outlet and smaller than an internal diameter of the second axial outlet,
    the control chamber receives a quantity of liquid which flows from the separation chamber to form a volume of liquid having an upper surface, and is connected to the injection device by a return circuit to reinject a quantity of liquid from the said control chamber to the injection device, and
    a regulation means comprising a pump suitable for regulating a level of the upper surface by reinjecting the quantity of liquid through the return circuit, and such that the interface surface has, in normal operating conditions, a diameter lying between the diameter of the first outlet and the diameter of the third outlet so that the said interface surface enters the control chamber and the liquid from the separation chamber flows to the said control chamber.

2. The separator according to claim 1, in which the first outlet is formed of a tube extending along the axis in the central volume, the said tube comprising lateral openings for extracting the gas from the said central volume.

3. The separator according to claim 1, in which the second outlet is an annular opening having an external diameter smaller than the diameter of the internal surface of the separation chamber.

4. The separator according to claim 1, in which the volume of the control chamber is smaller than the volume of the separation chamber.

5. The separator according to claim 1, in which the control chamber comprises at least one annular portion of its volume situated around the separation chamber.

6. The separator according to claim 5, in which the control chamber comprises a first portion into which the interface surface penetrates, a second annular portion situated beneath the first portion and around the separation chamber, and tubes connecting the said first and second portions in order to convey by gravity the liquid from the first portion to the second portion of the control chamber, the said liquid being extracted from this second portion of the control chamber to be reinjected to the injection device.

7. The separator according to claim 1, further comprising a tank connected to the control chamber by an outgoing pipe for extracting liquid from the control chamber to the said tank, and a return pipe for extracting liquid from the tank to the control chamber.

8. The separator according to claim 7, in which the control chamber comprises at least one control chamber sensor for measuring a liquid level in the said control chamber and also comprises a first control unit controlling a pump and a valve situated in the outgoing and return pipes, the said first control unit being suitable for controlling the said liquid level in the control chamber.

9. The separator according to claim 7, in which the tank comprises at least one tank sensor for measuring a liquid level in the said tank, and also comprises a second control unit controlling a pump for feeding the tank with liquid and a valve for discharging liquid from the reservoir, the said second control unit being suitable for controlling the said liquid level in the tank.

10. The separator according to claim 1, in which the control chamber comprises guiding elements for guiding the liquid that are designed to reduce a rotation about the longitudinal axis of the liquid originating from the separation chamber.

11. The separator according to claim 1, in which the separation chamber extends downwards between an upstream wall close to the injection device and a downstream wall opposite to the upstream wall, and in which the first outlet is situated in the upstream wall, and the second and third outlets are situated in the downstream wall.

12. The separator according to claim 1, in which the separation chamber extends upwards between an upstream wall close to the injection device and a downstream wall opposite to the upstream wall, and in which the first, second and third outlets are situated in the downstream wall.

13. The separator according to claim 4 wherein the volume of the control chamber is between 10% and 50% of the volume of the separation chamber.

\* \* \* \* \*